United States Patent
De la Fuente Lopez et al.

(10) Patent No.: US 9,969,502 B2
(45) Date of Patent: May 15, 2018

(54) IN-FLIGHT REFUELING METHOD AND SYSTEM FOR CONTROLLING MOTION OF THE HOSE AND DROGUE

(71) Applicant: EADS Construcciones Aeronauticas S.A., Madrid (ES)

(72) Inventors: Samuel De la Fuente Lopez, Madrid (ES); Bruno Martinez Vazquez, Madrid (ES)

(73) Assignee: EADS CONSTRUCCIONES AERONAUTICAS S.A., Madrid (ES)

( * ) Notice: Subject to any disclaimer, the term of this patent is extended or adjusted under 35 U.S.C. 154(b) by 323 days.

(21) Appl. No.: 14/640,652

(22) Filed: Mar. 6, 2015

(65) Prior Publication Data

US 2015/0251769 A1    Sep. 10, 2015

(30) Foreign Application Priority Data

Mar. 7, 2014 (EP) .................................. 14382082

(51) Int. Cl.
*B64D 39/06* (2006.01)
*B64D 39/00* (2006.01)
*B64D 39/02* (2006.01)

(52) U.S. Cl.
CPC ............. *B64D 39/06* (2013.01); *B64D 39/00* (2013.01); *B64D 39/02* (2013.01)

(58) Field of Classification Search
CPC ........ B64D 39/00; B64D 39/02; B64D 39/06; B65H 59/38
See application file for complete search history.

(56) References Cited

U.S. PATENT DOCUMENTS

| | | | | | |
|---|---|---|---|---|---|
| 2,692,102 | A | * | 10/1954 | Cobham | B64D 39/00 244/135 A |
| 2,879,017 | A | * | 3/1959 | Smith | B64D 39/02 244/135 A |
| 3,289,473 | A | * | 12/1966 | Louda | B66C 13/16 73/862.333 |
| 4,504,023 | A | * | 3/1985 | Lauritzen | B65H 59/38 242/390.9 |
| 4,569,489 | A | * | 2/1986 | Frey | B65H 59/38 191/12.2 A |
| 2003/0038214 | A1 | | 2/2003 | Bartov | |
| 2006/0060709 | A1 | | 3/2006 | Thal | |
| 2010/0072320 | A1 | * | 3/2010 | Bartov | B64D 39/02 244/135 A |
| 2015/0284107 | A1 | * | 10/2015 | De la Fuente Lopez | B64D 39/00 244/135 A |
| 2016/0362948 | A1 | * | 12/2016 | Baugh | E21B 17/01 |

FOREIGN PATENT DOCUMENTS

EP    2 644 509    10/2013

OTHER PUBLICATIONS

European Search Report cited in EP 14382082.7 dated Oct. 14, 2014.

* cited by examiner

*Primary Examiner* — Valentina Xavier
(74) *Attorney, Agent, or Firm* — Nixon & Vanderhye P.C.

(57) ABSTRACT

A method for in-flight refueling of a receiver aircraft from a tanker aircraft including: measuring continuously a tension at an end of a hose extending from the tanker aircraft towards the receiver aircraft, and using the measured tension to control a torque applied to a drum device deploying the hose from the tanker aircraft such that the tension at the end of the hose conforms to target tensions during each phase of the refueling operation.

10 Claims, 3 Drawing Sheets

IN-FLIGHT REFUELING METHOD AND SYSTEM FOR CONTROLLING MOTION OF THE HOSE AND DROGUE

RELATED APPLICATION

This application claims priority to European Application 14382082.7, filed Mar. 7, 2014, the entirety of which is incorporated by reference.

FIELD OF THE INVENTION

The present invention relates to hose and drogue in-flight refueling method and systems and more in particular to controlling the motion of the hose and drogue.

BACKGROUND

A known system for performing in-flight refueling operations, illustrated in FIGS. 1 to 3, is based on a refueling device 15 allowing fuel to pass from a tanker aircraft 13 to a receiver aircraft 11.

The refueling device 15 comprises a hose and drogue device 17 in the tanker aircraft 13 and a probe 25 in the receiver aircraft 11.

The hose and drogue device 17 comprises a flexible hose 19 that trails from a refueling unit (pod or FRU) located in the tanker aircraft 13, a reception coupling unit 23 at the end of the hose 19 which has a passage for receiving the nozzle of the probe 25, and a drogue 21 which is a fitting resembling a windsock or shuttlecock that is used to stabilise the hose 19 trailing from the tanker aircraft 13 and to provide the drag to maintain the hose catenary and the mating force with the probe 25.

The hose and drogue device 17 is extended and retracted from and to a drum device 35 that includes a winding drum for extending and retracting the hose 19 and a motor to actuate the winding drum. When not in use the hose 19 is reeled completely into the winding drum.

The probe 25 is a rigid arm placed on the receiver aircraft's nose or fuselage with a valve that is closed until it mates with the reception coupling unit 23 and is opened to allow fuel to pass from the tanker aircraft 13 to the receiver aircraft 11.

The fuel is pumped out from a fuel tank 31 to the hose 19 by means of a fuel pump 33.

A control unit 41 operatively connected with the fuel pump 33 and the drum device 35 manages the extension and retraction of the hose and drogue device 17 and the supply of fuel to the hose 19.

The motion of the hose and drogue device 17 during an in-flight refueling operation is subject to many forces that can vary throughout the in-flight refueling process. An improper control of the hose and drogue device in response to such forces can create significant risks for the receiver aircraft 11 and may cause missed contacts between the drogue and receiver aircraft. For example, the hose and drogue device 17 may break due to improper control and the forces applied to the device.

While the prior art has proposed solutions to particular problems such as US 2006/0060709 for the whipping of the hose and drogue device during the contact phase, a comprehensive control of the motion of the hose and drogue device 17 during all the in-flight refueling phases has not yet been achieved.

SUMMARY OF THE INVENTION

A hose and drogue in-flight refueling method and system has been invented and is disclosed herein that provides comprehensive control of the motion of the hose and drogue device during in-flight refueling.

In a first aspect, a refueling method has been conceived that controls the motion of the hose and drogue device using the following steps: a) measuring continuously the tension R at an end of the hose resultant from the applied forces on the drogue and from the tension $T_e$ applied to the hose by the drum device; b) using the measured tension R at the end of the hose to control the torque $T_o$ applied to the drum device such that the tension R at the end of the hose reaches target value(s) in each phase of the refueling operation.

The control method of the motion of the hose and drogue device may also include, in the phase of extension of the hose: c) measuring continuously the acceleration of the drogue; and d) using the measured acceleration of the drogue to detect unsuitable conditions for a connection between the drogue and the receiver aircraft.

A sudden variation of the tension R at the end of the hose is used in step b) to detect, respectively, the connection and disconnection of the hose and drogue device to the probe, and to quickly adjust the torque $T_o$ applied to the drum device to reach target values for the tension R at the end of the hose.

A hose and drogue in-flight refueling system is disclosed herein that comprises: (i) a sensing unit capable of measuring continuously the tension R at the end of the hose resulting from the applied forces on the drogue, including forces due to drag D and the tension $T_e$ applied to the hose by the drum device during a refueling operation, and (ii) a control unit operatively communicating with the sensing unit and the drum device. The control unit is configured to use the measurements of the tension R at the end of the hose to control the torque $T_o$ applied to the drum device such that the tension R at the end of the hose reaches desired target values in each phase of the refueling operation. A full control of the motion of the hose and drogue device can therefore be achieved taking into account the particular needs in each phase of the refueling operation.

The sensing unit is capable of measuring continuously the acceleration of the drogue and the control unit may be configured to measure the acceleration of the drogue to detect unsuitable conditions for a connection with a receiver aircraft. Information obtained from the sensing unit regarding the acceleration of the drogue and the tension on the hose may be transmitted to the pilot of the receiver aircraft. The pilot can use the information to control the hose and drogue and prevent dangerous connections.

In an embodiment, the sensing unit comprises a piezoelectric load cell to measure the tension R at the end of the hose and a triaxial accelerometer inside the drogue to measure its acceleration.

Other desirable features and advantages of the invention will become apparent from the subsequent detailed description of the invention and the appended claims, in relation with the enclosed drawings.

DETAILED DESCRIPTION OF EMBODIMENTS OF THE INVENTION

An in-flight refueling operation is performed in the phases that will be described below. In each of them the problems addressed by the invention will be mentioned.

Phase 1: Hose Extension

Figure 1:
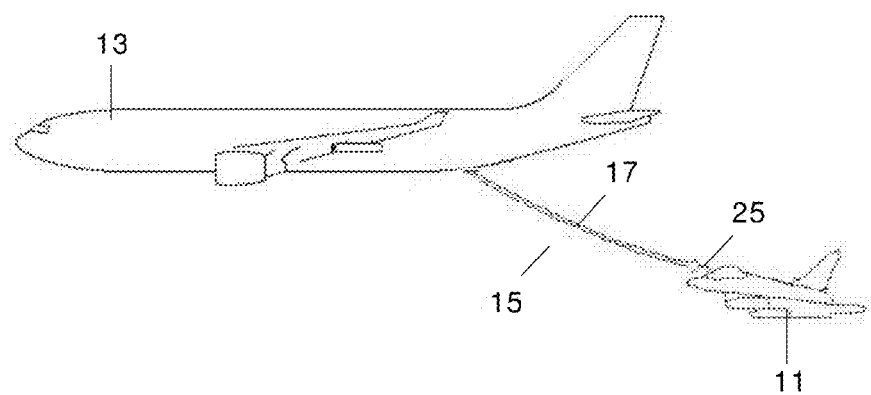
FIG. 1 is a schematic view of a refueling operation between a tanker aircraft and a receiver aircraft using a hose and drogue device.
Figure 2:
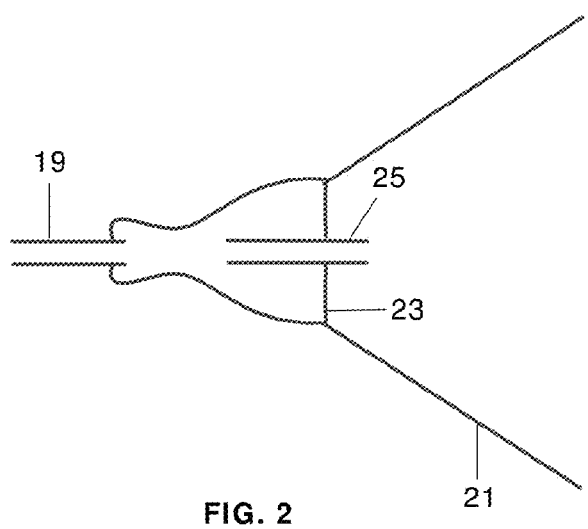
FIG. 2 shows the refueling coupling unit used for connecting the hose and drogue device of a tanker aircraft with the probe of a receiver aircraft.
Figure 3:
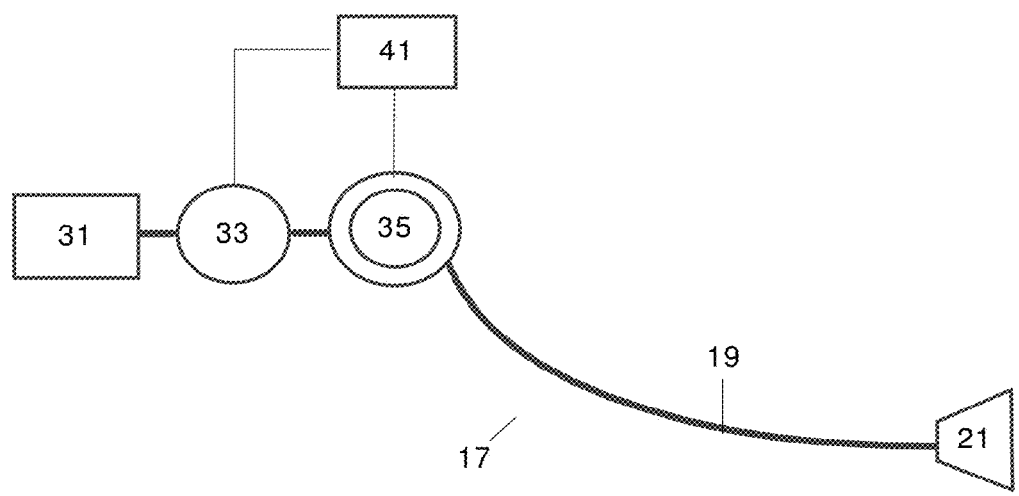
FIG. 3 is a block diagram of the control performed in a prior art hose and drogue in-flight refueling system.
Figure 4:
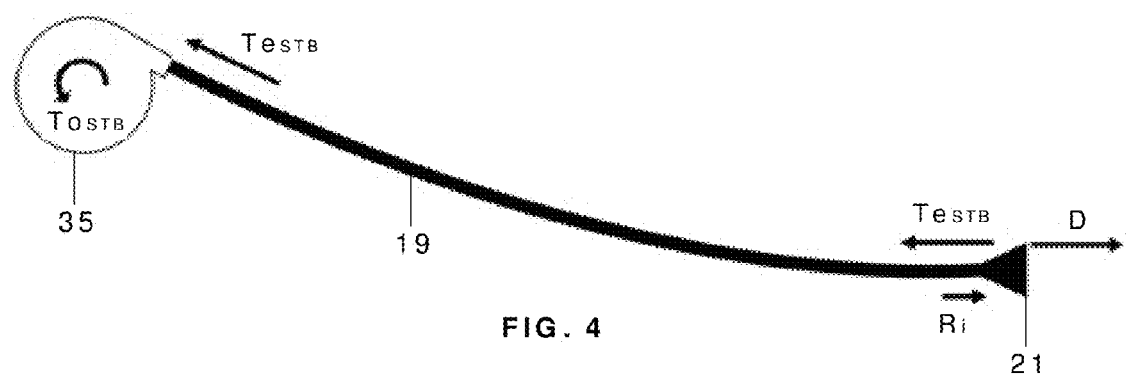
FIG. 4 shows the extension of the hose and drogue device.

To extend the hose 19, the drogue 21 is released into the airstream and the drag D (see FIG. 4) extends the hose 19. The control unit 41 is in charge of maintaining a constant extension speed of the hose 19 by controlling the drum device 35.

Once the hose and drogue device 17 is fully extended, a constant torque $T_{oSTB}$ is applied to the drum device 35, which is transmitted into a constant tension $T_{eSTB}$ at the hose 19. Brakes are also applied to the drum device 35. The $T_{oSTB}$ is fixed for every airspeed and should be lower than the theoretical drag D of the drogue 21, to keep a delta tension $R_i$ that eases the contact of the receiver aircraft 11.

The $T_{oSTB}$ values are traded-off for each type of drogue 21 and the pair $T_{oSTB}$, D determines the flight envelope in which the hose and drogue device 17 can work. $T_{oSTB}$ is usually fixed at the beginning of the design phases and cannot be modified afterwards.

A change in the drag performances of the drogue 21 or any increase of friction in the system due to life in service operation, might modify the $R_i$ value. If $R_i$ reaches a value that is not suitable for the refueling operation, the drogue and hose may in a dangerous condition. If $T_{eSTB}$ is too high, the hose extension may end-up in a hose auto-rewind condition or a drogue sail-away. If $T_{eSTB}$ is too low, the hose becomes too loose and has too much slack. Both situations are to be avoided in order to achieve proper contact between the drogue and the probe.

Phase 2: Receiver Connection

Once the drogue 21 is flying in the airstream, the receiver aircraft 11 has to maneuver to make the contact between the probe and the drogue. In certain flight conditions such us turbulence, the drogue 21 might be unstable which makes it difficult for the pilot of the receiver aircraft to contact with the drogue.

If the drogue and the probe do not connect, there is a missed contact which may be due to drogue instability. A missed contact creates a risk of damage to the receiver aircraft 11 and the hose and drogue device 17. Known refueling systems do not warn the receiver aircraft 11 whether the conditions for the contact are suitable or not.

When the probe 25 of the receiver aircraft 11 makes contact with the hose and drogue device 17, the drag D is suddenly absorbed by the receiver aircraft 11. As the receiver aircraft continuous to move forward, it continues pushing the hose and drogue device 17. That displacement creates a rotational movement to the winding drum, which is detected by the control unit 41. After the detection of the contact the control unit 41 commands the application of a torque $T_{oTC}$ to the drum device 35 for rewinding the hose and drogue device 17. A tension $T_{eTC}$ is, then, transmitted to the hose and drogue device 17 (see FIG. 5).

Known in-flight refueling systems are able to wind up against receiver at closure rates up to 10 ft/s, generating an acceleration of up to 20 ft/sec$^2$ of the hose 19. In known refueling systems there is always a reaction time between the probe 25 of the receiver aircraft 11 makes contact with the hose and drogue device 17 and the drum device 35 reacts rewinding the hose and drogue device 17. In some cases, this delay creates a wave that might travel upwards and downwards again, leading to whipping effects over the receiver aircraft 11 or the tanker aircraft 13.

In some cases, it is necessary to apply a transitory high torque to the drum device 35 in order to react to a fast contact. This also might create a high pull of the hose 19, which could lead to unexpected disconnections by exerting uncontrolled rewind torques.

Another problem is that when the receiver aircraft 11 is close to the connection, there is a local modification of the forces balance of the drogue 21 due to bow effect (the drag is reduced). This local reduction of drag D can make the hose 19 to slightly move in (due to $T_{eTC}$). This small movement might be identified as a contact. As a result, the hose 19 will start rewinding and the drogue 21 will sail away from the receiver aircraft. The consequence is a missed contact, so the operation needs to be repeated again, with the corresponding time consumption.

Another problem is that there is not feedback to the pilot of the receiver aircraft 11 with respect to the suitability of the hose and drogue device 17 to proceed to the connection.

Phase 3: Receiver in Contact

When the probe 25 of the receiver aircraft 11 is in contact with the hose and drogue device 17 the system keeps the torque $T_{oTC}$ to allow a calculated tension control $T_{eTC}$.

Since the tension of the hose 19 is controlled indirectly by a pre-defined drum torque $T_{oTC}$, variations of friction in the system throughout the service life, might modify the actual tension of the hose and create unexpected disconnections (if $T_{eTC}$ is greater than expected) or hose "sag" during the contact (if $T_{eTC}$ is lower than expected).

Phase 4: Disconnection and Return to Ready for Contact Position

When the probe 25 of the receiver aircraft 11 is to disconnect, the receiver aircraft pulls back on the hose and drogue device 17 which is trailed in a controlled way following the receiver movement. If the hose and drogue device 17 is accelerated too fast or reaches the full extended position, the system applies brakes and the receiver aircraft 11 disengages.

In known refueling systems, during fast disconnections, the receiver aircraft might disconnect when the hose 19 is not at full extended position (short hose event). It is needed, then, to apply a manual or automatic procedure to extend the hose 19. The automatic procedure is based on indirect measurements, such us partial torque relief. Those indirect measurements might lead to unintentional application of auto trail function while the receiver is in contact, which might create some oscillations in the hose 19. In other cases, when the receiver aircraft 11 is disconnected, the hose 19 might not be trailed if the tension release is not high enough to cope with the drogue drag and friction in the system.

Phase 5: Hose Retraction

When the refueling operation is finished, the hose and drogue device 17 is retracted. Usually, the hose and drogue device 17 is retracted by keeping a constant rotational speed of the drum.

Figure 6:
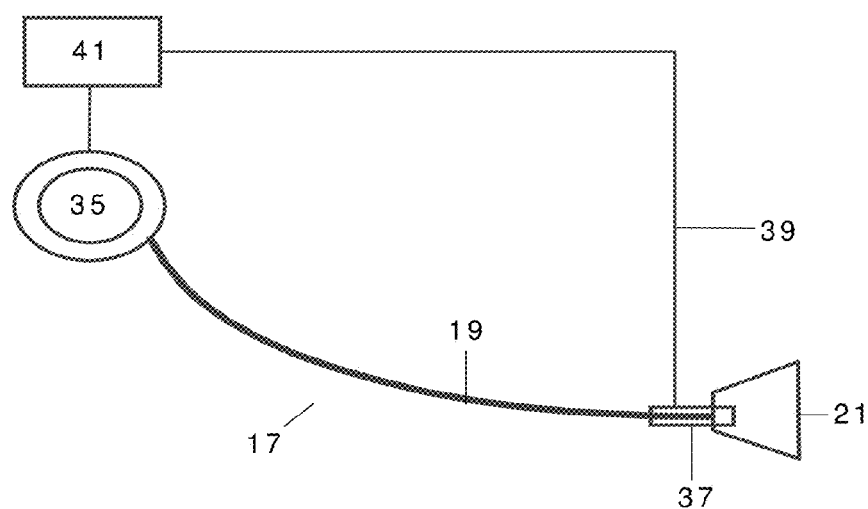
FIG. 6 is a block diagram of the control of the hose and drogue device motion performed in the in-flight refueling system.

The hose and drogue in-flight refueling system of the invention comprises (see FIG. 6):

A sensing unit 37 located at the end of the hose and drogue device 17 capable of measuring the tension applied to the end of the hose 19 and, additionally the acceleration A of the drogue 21 during a refueling operation.

A control unit 41 operatively communicated through a communication link 39 with the sensing unit 37 (in addition to being operatively communicated with the drum device 35) and adapted to use the measure of the tension at the end of the hose 19 to control the torque $T_o$ applied to the drum device 35 so that the tension of the hose 19 reaches a target value along the refueling operation and, additionally, to use the measure of the acceleration of the drogue 21 to inform the receiver pilot about the suitability of the hose and drogue device 17 for a contact.

Figure 7:
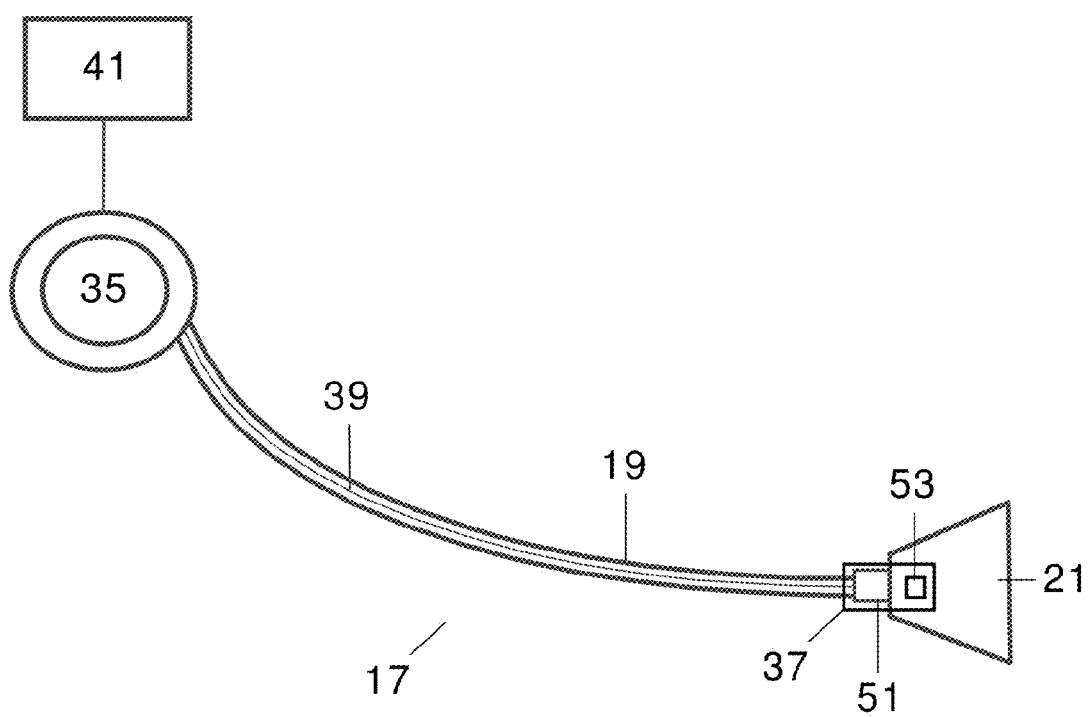
FIG. 7 is a block diagram of the control of the hose and drogue device motion in an embodiment of the in-flight refueling system.

In an embodiment of the invention (see FIG. 7) the sensing unit 37 comprises a triaxial accelerometer 53 inside the drogue 21 for measuring its acceleration and a piezoelectric load cell 51 placed between the drogue 21 and the hose 19 for measuring axial loads. The communication link 39 between the sensing unit 37 and the control unit 41 is a fiber optic line embedded inside the hose 19.

The operation of the above mentioned embodiment of the hose and drogue in-flight refueling system of the invention in the different phases of a refueling operation is as follows.

Phase 1: Hose Extension

The drogue is released into the airstream and is pulled back by the drag D. The tension R resultant over the end of the hose 19 (see FIG. 4) is measured by the piezoelectric load cell 51 of the sensing unit 37. That tension R is controlled by the control unit 41 by sending commands to the drum device 35 to vary its torque $T_o$ to obtain a fixed deployment speed of the hose.

By detecting variations over the required torque $T_o$ to extend/retract the hose 19, the system is also able to identify friction variations which can be stored in the control unit 41 for maintenance purposes.

Once the hose 19 is at full trail, the piezoelectric load cell 51 sense the resultant tension R and the control unit 41 adapt the torque $T_o$ of the drum device 35 to achieve a tension value $R_i$ which eases the contact.

In this way, variations over the drogue drag D, friction or airspeed are taken into account by the direct measurement of the tension R, so that the calculated value of $R_i$ will be always the most suitable tension value at the end of the hose 19 for the contact.

In addition, no auto-rewinds will occur since the control unit 41 will adapt the torque $T_o$ to obtain the optimum $R_i$, such that the hose 19 will always have the right tension to perform the contact.

Once the drogue 21 is at full trail, drogue movements will be measured by the triaxial accelerometer 53 of the sensing unit 37. If those measurements overpass a predefined limit the receiver pilot will be informed (activating for example a red light placed at the end of the hose and drogue device 17) that the contact can end up in a missed one for preventing it.

Phase 2: Receiver Connection

Once the receiver aircraft 11 makes contact, the sudden tension variation in the hose 19 is detected by the piezoelectric load cell 51 of the sensing unit 37 and the information is sent to the control unit 41 through the fiber optical line 39.

Figure 5:
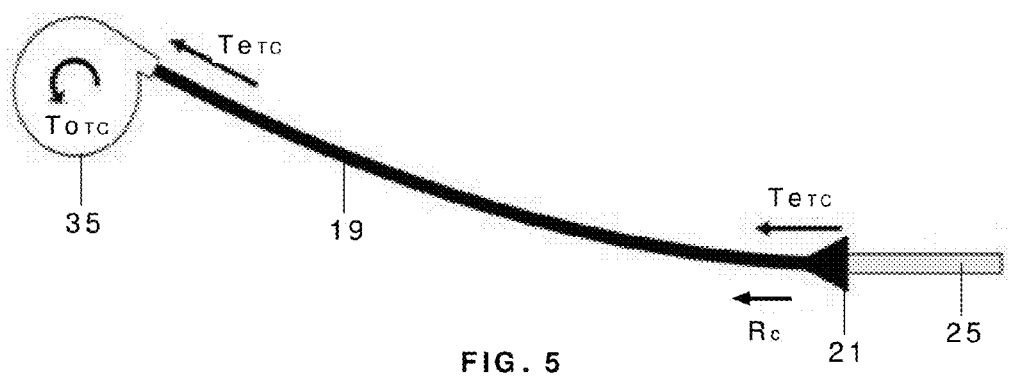
FIG. 5 shows the retraction of the hose and drogue device immediately after the connection with the probe of the receiver aircraft.

The control unit 41, then, detects the contact and commands the drum device 35 to achieve a desirable force resultant $R_c$ (see FIG. 5). Commanding the torque $T_o$ of the drum device 35 generates a quicker response than a speed/position command and limits the risk of false contacts.

The acceleration of the drogue 21 is also measured by the triaxial accelerometer 53 of the sensing unit 37. Therefore, the application of a torque $T_o$ to the drum device 35 to achieve $R_c$ can be adjusted to the acceleration needs. This adapts the application of the torque $T_o$ to the actual closure rate of the contact, assuring a smooth application for soft contacts and a faster reaction for higher closure rates.

Since the contact is detected as it happens, the system will react fast enough to prevent any whipping event.

In addition, since the sensing unit 37 is measuring directly the tension R, the bow effect is also compensated as the receiver aircraft 11 approaches, so that sail-aways are prevented.

Phase 3: Receiver in Contact

The control unit 41 keeps the suitable force resultant $R_c$ during the contact. The tension of the hose 19 is always kept in an optimum value. The torque $T_o$ will be accommodated to achieve $R_c$ and, therefore, no unexpected disconnections (due to high $R_c$) or hose sag (due to low $R_c$) will happen.

Phase 4: Disconnection and Return to Ready for Contact Position

When the receiver aircraft 11 moves back to initiate the disconnection, the hose 19 will follow him by keeping the constant $R_c$. If at any point, the speed of the drum speed exceeds certain limit, the system will apply brakes.

The disconnection is detected by the sudden change in the forces (the drag D of the drogue 21 appears again).

If after a disconnection, the hose is not fully trailed, the system will detect it and will adjust the resultant tension R to allow a controlled hose extension to full trail position.

By this procedure, the hose is always automatically trailed after the confirmation that the receiver aircraft has disconnected. Therefore, there will not be any inadvertent activation of the auto-trail function during the Phase 3: Receiver in contact. In addition, since the system modifies the torque $T_o$ to achieve a desirable resultant tension R, the hose 19 will be always full trailed, even if there are variations in the drag D of the drogue 21 or in the friction of the system with respect to the design conditions.

Although the present invention has been described in connection with various embodiments, it will be appreciated from the specification that various combinations of elements, variations or improvements therein may be made, and are within the scope of the invention as defined by the appended claims.

The invention claimed is:

1. A method for performing an in-flight refueling operation of a receiver aircraft from a tanker aircraft with a refueling device, wherein the refueling device includes a hose and drogue assembly for delivering fuel, extendable and retractable from and to the tanker aircraft by a drum device, and a probe on the receiver aircraft, extendable and retractable from and to the receiver aircraft for receiving fuel, wherein the hose and drogue assembly includes a hose, a reception coupling unit at the end of the hose and a drogue attached to the reception coupling unit, the method comprises:

measuring a tension R at an end of the hose resultant from forces applied to the drogue and from a tension $T_e$ applied to the hose by the drum device, and using the measured tension R to control a torque $T_o$ applied to the drum device such that the tension R at the end of the hose conforms to one or more target tension values during each phase of the refueling operation, wherein the phases of the refueling operation include hose extension, receiver connection with the drogue, receiver in contact with the drogue, disconnection and return of the drogue and hose assembly to a ready for contact position.

2. The method according to claim 1, wherein during the hose extension phase the method includes:
   measuring continuously an acceleration of the drogue, and
   using the measured acceleration to detect an unsuitable condition for connecting the drogue to the receiver aircraft.

3. The method according to claim 1, during at least one of the phases of the receiver in contact with the drogue and the disconnection and return of the drogue and hose assembly to a ready for contact position, the method includes:
   detecting a connection or disconnection of the hose and drogue assembly to or from a probe on the receiver aircraft, and
   in response to the detection of the connection or the disconnection, adjusting the torque applied to the drum device to cause the tension at the end of the hose to conform to one or more target tension values.

4. A method for an in-flight refueling operation of a receiver aircraft from a tanker aircraft with a refueling device, wherein the refueling device includes a hose and drogue assembly extendable and retractable a drum device in the tanker aircraft, wherein method comprises:
   measuring a tension applied to a hose of the hose and drogue assembly during a refueling operation, wherein the tension is measured at an end region of the hose proximate to a drogue of the hose and drogue assembly, and
   using the measured tension to control a torque applied to the drum device and to maintain the tension applied to the hose within at least one target tension values continuously while the hose is extended from the drum device during a refueling operation.

5. The method of claim 4 wherein the tension is measured by a piezoelectric load cell.

6. The method of claim 4 further comprising measuring in real time an acceleration of the drogue, and determining whether the hose and drogue assembly is in an aerodynamic condition unsuited to connecting to the receiver aircraft.

7. The method according to claim 4, further comprising:
   detecting a connection or disconnection of the hose and drogue assembly to or from a probe on the receiver aircraft, and
   in response to the detection of the connection or the disconnection, adjusting the torque applied to the drum device to cause the tension at the end of the hose to conform to one or more target tension conditions.

8. The method of claim 4, wherein the tension R is measured continuously.

9. The method of claim 4, wherein the tension applied to the hose of the hose and drogue assembly during a refueling operation is measured in real time.

10. The method of claim 4 wherein the one or more target tension values includes a target tension value for each phase of the in-flight refueling operation, and the phases include fuel hose extension, receiver aircraft connection with the drogue, probe of the receiver aircraft in contact with the drogue, and disconnection of the drogue from the receiver aircraft and retraction of the fuel hose to a ready for contact position.

* * * * *